United States Patent
Campagna et al.

(10) Patent No.: US 8,239,903 B1
(45) Date of Patent: Aug. 7, 2012

(54) OPEN CABLE APPLICATION PLATFORM (OCAP), SET-TOP BOX (STB), NEXT GENERATION SERVICE APPLICATION

(75) Inventors: Theresa Campagna, Philadelphia, PA (US); David L. Chavez, Broomfield, CO (US); Gregory D. Weber, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 293 days.

(21) Appl. No.: 12/210,628

(22) Filed: Sep. 15, 2008

(51) Int. Cl.
*H04N 7/173* (2011.01)

(52) U.S. Cl. ........ 725/107; 725/100; 725/131; 725/139; 725/151

(58) Field of Classification Search .............. 725/60–61, 725/86–90, 100, 131, 107, 139, 151
See application file for complete search history.

(56) References Cited

U.S. PATENT DOCUMENTS

| | | | |
|---|---|---|---|
| 6,397,387 B1 | 5/2002 | Rosin et al. | |
| 6,564,261 B1 | 5/2003 | Gudjonsson et al. | |
| 6,637,029 B1 | 10/2003 | Maissel et al. | |
| 7,075,919 B1 | 7/2006 | Wendt et al. | |
| 7,181,689 B2 | 2/2007 | Mock et al. | |
| 7,237,251 B1 | 6/2007 | Oz et al. | |
| 7,305,697 B2 * | 12/2007 | Alao et al. | 725/114 |
| 7,522,579 B1 | 4/2009 | Mangal et al. | |
| 7,610,390 B2 | 10/2009 | Yared et al. | |
| 2002/0056109 A1 | 5/2002 | Tomsen | |
| 2002/0073421 A1 | 6/2002 | Levitan et al. | |
| 2002/0087968 A1 | 7/2002 | Krishnan et al. | |
| 2003/0005462 A1 | 1/2003 | Broadus et al. | |
| 2003/0048380 A1 | 3/2003 | Tamura | |
| 2003/0086694 A1 | 5/2003 | Davidsson | |
| 2003/0172376 A1 | 9/2003 | Coffin | |
| 2004/0006627 A1 | 1/2004 | Sarfaty et al. | |
| 2004/0048380 A1 | 3/2004 | Saggio et al. | |
| 2004/0073915 A1 | 4/2004 | Dureau | |
| 2004/0117831 A1 | 6/2004 | Ellis et al. | |
| 2005/0050160 A1 | 3/2005 | Upendran et al. | |
| 2005/0233743 A1 | 10/2005 | Karaoguz et al. | |
| 2005/0235319 A1 | 10/2005 | Carpenter et al. | |

(Continued)

FOREIGN PATENT DOCUMENTS

EP 0982954 3/2000

(Continued)

OTHER PUBLICATIONS

"Delivering True Triple Play—Composite Applications and the Role of SIP," Alcatel, retrieved from Internet at http://www.alcatel-lucent.com/tripleplay, retrieved Feb. 6, 2007, 6 pages.

(Continued)

*Primary Examiner* — Pankaj Kumar
*Assistant Examiner* — Mulugeta Mengesha
(74) *Attorney, Agent, or Firm* — Sheridan Ross P.C.

(57) ABSTRACT

One exemplary aspect is advanced multimedia communications via OCAP using customer specific profiles resident in the STB for service application management. Additional aspects relate to service application management including filtering, controlling the display of content associated with one or more service applications, performing an action based on the service application, scheduling a communication based on the service application and initiating a request for service based on, for example, a detected problem. Still further aspects relate to managing information associated with a service application received at a STB including initiating a communication to a support representative.

20 Claims, 5 Drawing Sheets

U.S. PATENT DOCUMENTS

| | | | |
|---|---|---|---|
| 2005/0283800 | A1 | 12/2005 | Ellis et al. |
| 2006/0020950 | A1 | 1/2006 | Ladd et al. |
| 2006/0218226 | A1 | 9/2006 | Johnson et al. |
| 2007/0050836 | A1* | 3/2007 | Stanek et al. ............. 725/131 |
| 2007/0101413 | A1 | 5/2007 | Vishik et al. |
| 2007/0107017 | A1* | 5/2007 | Angel et al. ............... 725/62 |
| 2007/0122108 | A1 | 5/2007 | Bontempi |
| 2007/0162930 | A1* | 7/2007 | Mickle et al. .............. 725/37 |
| 2007/0180485 | A1* | 8/2007 | Dua ............................ 725/114 |
| 2007/0186231 | A1 | 8/2007 | Haeuser et al. |
| 2007/0198738 | A1 | 8/2007 | Angiolillo et al. |
| 2007/0223523 | A1 | 9/2007 | Montpetit et al. |
| 2007/0240230 | A1 | 10/2007 | O'Connell et al. |
| 2007/0250864 | A1 | 10/2007 | Diaz Perez |
| 2008/0010584 | A1 | 1/2008 | Corsetti et al. |
| 2008/0022336 | A1* | 1/2008 | Howcroft et al. .......... 725/100 |
| 2008/0046311 | A1 | 2/2008 | Shahine et al. |
| 2008/0066133 | A1* | 3/2008 | Yun ............................ 725/131 |
| 2008/0288996 | A1 | 11/2008 | Walter et al. |
| 2009/0009586 | A1* | 1/2009 | Cassanova ................ 348/14.04 |

FOREIGN PATENT DOCUMENTS

| | | |
|---|---|---|
| EP | 1162840 | 12/2001 |
| WO | WO 00/05889 | 2/2000 |
| WO | WO 00/49801 | 8/2000 |
| WO | WO 01/17250 | 3/2001 |
| WO | WO 01/43424 | 6/2001 |
| WO | WO 02/069627 | 9/2002 |
| WO | WO 03/088655 | 10/2003 |
| WO | WO 2005/125203 | 12/2005 |

OTHER PUBLICATIONS

Official Acton for U.S. Appl. No. 12/134,738, mailed Nov. 24, 2010.
Official Acton for U.S. Appl. No. 12/134,738, mailed May 5, 2011.
Official Action for U.S. Appl. No. 12/134,738, mailed Dec. 6, 2011, 13 pages.
U.S. Appl. No. 12/050,575, filed Mar. 18, 2008, Campagna et al.
U.S. Appl. No. 12/050,605, filed Mar. 18, 2008, Campagna et al.
U.S. Appl. No. 12/050,634, filed Mar. 18, 2008, Campagna et al.
U.S. Appl. No. 12/050,677, filed Mar. 18, 2008, Campagna et al.
U.S. Appl. No. 12/130,611, filed May 30, 2008, Campagna et al.
U.S. Appl. No. 12/130,642, filed May 30, 2008, Campagna et al.
U.S. Appl. No. 12/134,738, filed Jun. 6, 2008, Campagna et al.
"Open Cable Application Platform Specifications (OCAP) 1.1", Cable Television Laboratories, Inc., dated Dec. 29, 2006, pp. 1-636, available at http://opencable.com/ocap.
Miller, et al., "FashionMe: The Future of Fashion Shopping over the Internet", available at http://www.fashionme.iao.fraunhofer.de/Fashionme.pdf, Sep. 2000, pp. 1-6.
Background of the Invention for above-captioned application (previously provided).

* cited by examiner

OPEN CABLE APPLICATION PLATFORM (OCAP), SET-TOP BOX (STB), NEXT GENERATION SERVICE APPLICATION

CROSS-REFERENCE TO RELATED APPLICATIONS

Cross reference is made to:
U.S. patent application Ser. No. 12/050,575, filed Mar. 18, 2008, entitled "OPEN CABLE APPLICATION PLATFORM SET-TOP BOX (STB) PERSONAL PROFILES AND COMMUNICATIONS APPLICATIONS,";
U.S. patent application Ser. No. 12/050,605, filed Mar. 18, 2008, entitled "OPEN CABLE APPLICATION PLATFORM SET-TOP BOX (STB) PERSONAL PROFILES AND COMMUNICATIONS APPLICATIONS,";
U.S. patent application Ser. No. 12/050,634, filed Mar. 18, 2008, entitled "OPEN CABLE APPLICATION PLATFORM SET-TOP BOX (STB) PERSONAL PROFILES AND COMMUNICATIONS APPLICATIONS,"; and
U.S. patent application Ser. No. 12/050,677, filed Mar. 18, 2008, entitled "OPEN CABLE APPLICATION PLATFORM SET-TOP BOX (STB) PERSONAL PROFILES AND COMMUNICATIONS APPLICATIONS," all of which are incorporated herein by reference in their entirety.

FIELD OF THE INVENTION

The invention relates generally to set-top boxes and more particularly to one or more profiles associated with a set-top box. Additional aspects of the invention relate to the interoperability of STB's, one or more profiles and one or more applications associated with the open cable application platform that enable a next generation of service applications.

BACKGROUND OF THE INVENTION

Multiple Service Operators (MSOs), e.g., cable companies, are working to transform their value proposition from one dominated by basic subscriptions and equipment leases to a customer service driven value model. One of the reasons for this is the recent ruling by the Federal Communications Commission (FCC) that MSOs adopt the Open Cable Application Platform (OCAP) and that Set-Top Boxes (STBs) be open to other uses. With larger pipes, more powerful STBs, and improved customer service applications residing in those STBs, the MSO can begin to dominate the other Local inter-Exchange Carriers (LECs). This enhanced customer service value equation is viewed to be one key to continued MSO growth, increased revenue and increased margins. OCAP is a new paradigm that will allow MSOs to create, or have made, and deploy, a whole suite of new interactive communications services that can drive new revenue streams with higher margins for the MSOs. The OCAP middleware, written in the Java® language, will facilitate "write once, use anywhere" application software to provide new features and services created by third party developers.

The OpenCable™ Platform specification can be found at http://www.opencable.com/ocap/, "OpenCable Application Platform Specification (OCAP) 1.1," which is incorporated herein by reference in its entirety.

OCAP is an operating system layer designed for consumer electronics, such as STBs, that connect to a cable television system. Generally, the cable company controls what OCAP programs can be run on the STB. OCAP programs can be used for interactive services such as eCommerce, online banking, program guides and digital video recording. Cable companies have required OCAP as part of the CableCard 2.0 specification, and they indicate that two way communications by third party devices on their networks will require them to support OCAP.

More specifically, OCAP is a Java® language-based software/middleware portion of the OpenCable initiative. OCAP is based on the Globally Executable Multimedia Home Platform (MHP) (GEM)-standard, as defined by CableLabs. Because OCAP is based on GEM, OCAP shares many similarities with the Multimedia Home Platform standard defined by the Digital Video Broadcasting (DVB)-project. The MHP was developed by the DVB Project as the world's first open standard for interactive television. It is a Java® language-based environment which defines a generic interface between interactive digital applications and the terminals on which those applications execute. MHP was designed to run on DVB platforms but there was a demand to extend the interoperability it offers to other digital television platforms. This demand gave rise to GEM, or Globally Executable MHP, a framework which allows other organizations to define specifications based on MHP.

One such specification is OCAP which has been adopted by the US cable industry. In OCAP the various DVB technologies and specifications that are not used in the US cable environment are removed and replaced by their functional equivalents, as specified in GEM. On the terrestrial broadcast side, CableLabs and the Advanced Television Systems Committee (ATSC) have worked together to define a common GEM-based specification, Advanced Communications Application Platform (ACAP), which will ensure maximum compatibility between cable and over-the-air broadcast receivers.

Packet Cable 2.0 is a specification based on the wireless Third Generation Partnership Program (3GPP) Internet protocol Multimedia Subsystem (IMS), which uses Session Initiated Protocol (SIP) for session control. By using SIP, MSOs can create the foundation of a service delivery platform on top of their existing DOCSIS (Data Over Cable Service Interface Specification) or cable modem service. Two of the SIP features that are particularly important to this invention are extensibility and interoperability. These SIP features are important because new messages and attributes can be easily defined and communications between previously incompatible endpoints are facilitated.

Another development that sets the stage for the disclosed inventions is the processing power, multimedia codecs and storage capabilities of the STBs. Many of the more advanced STBs have Digital Video Recorders (DVRs) based on hard disk drives or flash memory that provide many gigabytes of available storage. They also have advanced audio/video codecs designed to handle the requirements of High Definition Television (HDTV). Processors such as the Broadcom BCM7118 announced in January 2007, provide over 1000 Dhrystone mega-instructions per second (DMIPS) worth of processing power to support OCAP, new customer applications, and DOCSIS 2.0 and DSG advanced mode. The Broadcom chip, and other general purpose and application-specific integrated circuit (ASIC) processors used for STBs, provide powerful security capabilities such as the emerging Polycipher Downloadable Conditional Access Security (DCAS) system. DCAS eliminates the need for a CableCard and supports multiple conditional access systems and retail products.

SUMMARY OF THE INVENTION

An exemplary aspect of this invention relates to a next generation of service applications.

Customers of a cable network may periodically be faced with diagnosis or repair of a problem or the desire to change the package that they are subscribing to, address billing issues, need a tutorial for a specific project or desire to take a class to, for example, repair a broken item. In current networks, this entails calling a customer help line and/or scheduling a service call to the premises to seek such assistance. An exemplary embodiment of this application would present a new service using the OCAP client and back-end server. The consumer would indicate to the client that they need assistance. The client would send the appropriate information to the back-end server. Once the information is received, a screen could be pushed to the STB that would provide the initial customer service interface. The screen could provide common options like "change subscription package," "request help with a problem," and other service related requests. This service could also alert the customer proactively to notify them of a detected service issue requiring attention or a promotional offer to take enhanced service(s). The customer could initially interact with the screens pushed to their set top box. However, if the customer has questions not addressed by those screens, they could have the STB place a telephone call to a live customer service agent who would also be able to review screen pops from the customer's interaction with the help menu thus far. If this too is inadequate for the customer's needs, a live, two-way, full-motion video call could be set up between the customer and the service agent. This would provide a significant customer service enhancement and technical advance over the current art.

In a further exemplary embodiment of the invention, the service request could be for another company that offers this enhanced service capability through the MSO operator. Examples of such companies might include, but are not limited to audio/video component companies, or even unrelated household appliances, and the like, and in general any entity. Overall, aspects of this invention are more convenient, more specifically targeted to the user and are more effective than other existing customer service options and have the advantage of HD quality, two-way full-motion video as an option, if needed, to work the service issue. The vendor of the service could provide increased convenience, more accurate diagnosis and improved customer service at a reduced cost compared with a home service call. The operator of the network would have an additional opportunity for revenue by charging other service vendors for offering the service. The fact that schedule, personal preference, payment options and other personalized data can be safely stored in the STB allows easy facilitation of subsequent transactions.

One central aspect of the idea proposed here is the use of personalized information and personal preferences contained in a STB combined with a next generation customer service application and improved security to provide a greatly enhanced user experience.

As discussed, instead of calling a customer help line or scheduling a home service call, the customer is presented with a help screen on their STB. Some interactions will be possible to complete using the screen push to the STB combined with the customer's interaction with them. Other interactions may require escalation to a voice call or even a full motion video session to better facilitate providing the customer with assistance.

The two-way, full-motion, HD video without many of the quality issues associated with the Internet is a significant enhancement to current service paradigms. It would provide an opportunity for video about the service request to be coordinated with a live telephone call from a customer service agent.

In an additional exemplary embodiment, rather than pushing video or web communication to the STB, a live call could be placed to the consumer's phone and a live feed could be sent to the users STB allowing for a more customized approach to be offered to certain customers.

An additional aspect of the invention relates to the combination of a user's personal service preferences and the ability for one or more service providers' information to be filtered and presented to the user via one or more of a STB, or electronic or communication device associated with the STB.

Additional aspects relate to the ability to offer a live session to certain customers or those requiring additional assistance or information and provides a further benefit and advantage beyond existing technology.

Another exemplary aspect of the invention is the use of personalized information and personal preferences contained in the STB combined with one or more service applications and improved security to provide a greatly enhanced user experience.

The fact that sensitive information about the user can be stored within their own STB, improves security concerns associated with having too much of a web presence. The disclosure or query of personal information can be established on a trust basis which also helps with security and privacy. The push of security information, such as DCAS, makes the environment significantly safer. One could also envision if there are multiple users within one household, that they can each have a sale or shopping profile that can be, for example, login protected for personal privacy and protection. Therefore, parents would be able to set certain conditions or limits for children, employers for employees, and the like, using the service application that could also add to the safety and age-appropriate use of the application.

Two-way, full-motion, HD video without many of the quality issues associated with the internet is a significant enhancement to current sale or shopping paradigms. It could provide an opportunity for video out the product to be coordinated with a live telephone call from a customer service agent.

Personal information stored in the STB can convey one or more of the benefits listed in related invention disclosures such as communication preferences, alternate contact modalities, payment preferences, priority preferences, trusted contacts, personal information, as well as multi-media messaging, and the like. The integration of the personal information combined with an intelligent personal agent can also enhance the user experience.

The present invention can provide a number of advantages depending on the particular configuration.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

Figure 1:
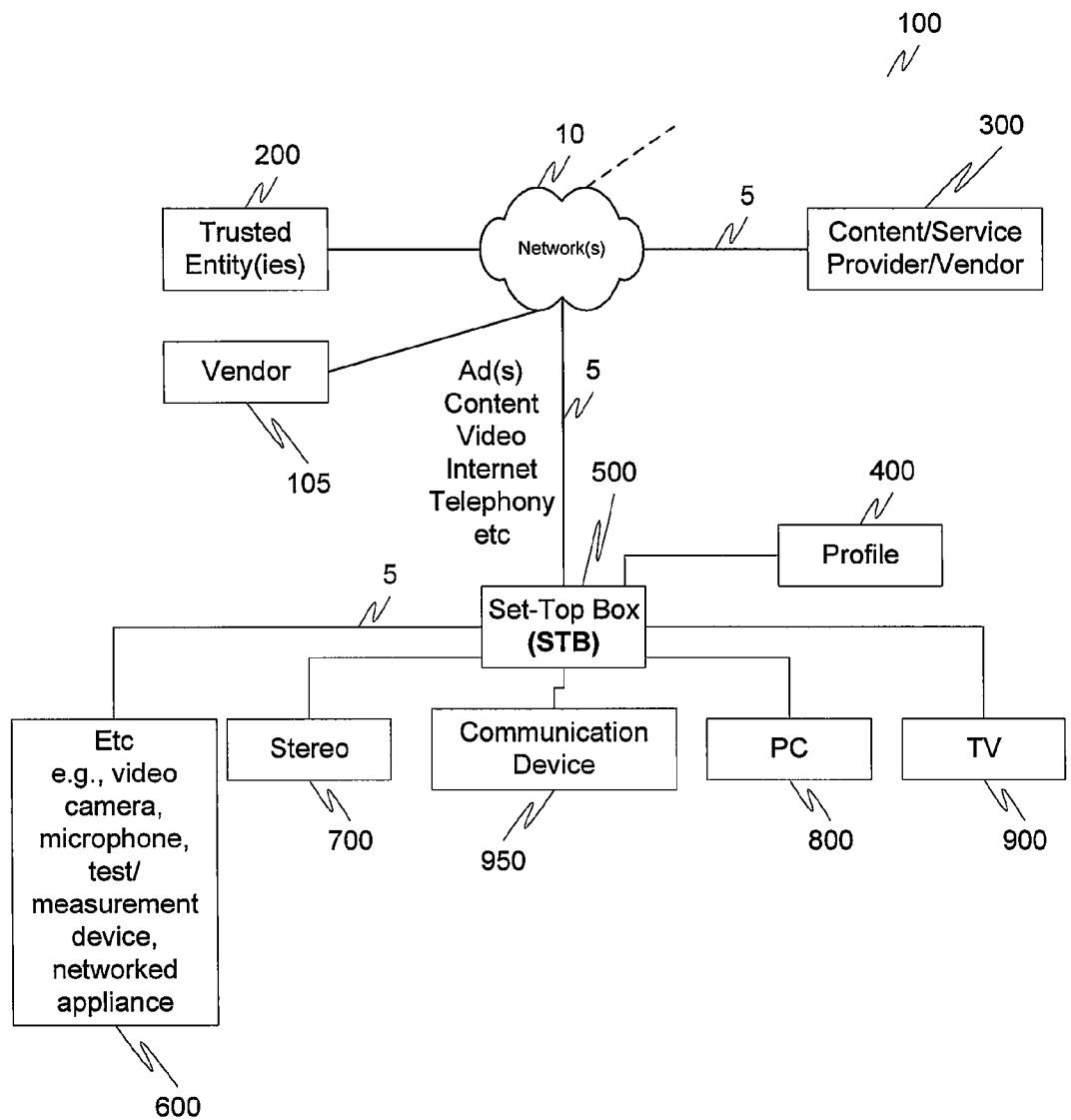
FIG. 1 illustrates an exemplary content system according to this invention.

FIG. 1 illustrates an exemplary content system 100. The system 100 comprises one or more trusted entities 200, one or more content/service providers 300, such as a cable company and a set-top box 500, all interconnected by one or more links 5 and network(s) 10. The set-top box 500 is connected to one or more of a stereo 700, PC 800, TV 900, communication device 950, or in general any electronic or communication device as represented generally by element 600. Associated with the STB are one or more profiles 400 as will be discussed in detail hereinafter.

In general, the STB 500 is capable of receiving content, such as one or more service applications, video information, multimedia information, voice communications, and the like. As will be discussed hereinafter, the STB is also capable of providing services such that, for example, a user located at one of the associated devices can utilize the STB to assist with the ordering, consumption, management, participation in or maintenance of one or more services associated with the STB.

Typically, the content/service provider 300 provides content, such as video content, to a user via the STB 500. An exemplary embodiment of the present invention expands on this concept, and in conjunction with profile 400 provides enhanced content capabilities through the STB 500 to one or more of the associated devices.

In accordance with an optional exemplary embodiment, trusted relationships can be established between the content/service provider 300 and one or more trusted entities 200. Additionally, trusted relationships could be established between the user of the STB 500 and one or more trusted entities 200. For example, the content/service provider 300, such as a cable company, could negotiate trusted relationships with various service providing entities. Upon the completions of various checks and assurances from the service providing entities, the various entities could be listed as a trusted entity 200, at which point service requests made via the set-top box 500 in conjunction with the profile 400 could be handled in a different manner.

A user could also negotiate or select various other entities (not shown) and identify them as trusted entities. For example, and in accordance with an exemplary embodiment of the this invention, if a user frequently buys tech support services from a particular vendor 105 and has a good service history with that vendor, the user could identify that vendor as trusted which may have an effect on how the various filters and rules are applied as discussed hereinafter. For example, once a vendor is identified as trusted, the vendor may be able to provide additional information, such as advertising, to the user.

The association of the profile 400 with the STB 500 allows, for example, a richer communications environment to be provided to a user. For example, a customer at their home can call into a customer service number. Instead of the call being rerouted from center to center based on the information the consumer inputs via the phone, the call could use a common customer routing center. The routing center, which could be one of the trusted entities 200, can use the phone number to look-up a key set-top box entry for the customer, and the center can then electronically retrieve the storage service information entry via the STB 500 from the profile 400. The information retrieved from the profile 400 can be combined with the caller's requested service, routed to the appropriate agent with the information retrieved from the customer STB (relieving the need to interrogate other databases for the user and making for more efficient contact center), and additional information for the customer can be displayed on, for example, the TV 900, PC 800, or in general, any device associated with the STB 500.

In another example, the customer can initiate a service transaction on the STB itself. For example, a menu-based request can use stored service information in the profile 400 to key a web service request. If the question triggers a human response, like that from a technical support agent or a follow-up sales agent when the query about a specific product is made, the STB information can key to the customer phone for an outbound call to provide additional information about the identified product(s) and optionally about the customer at the STB as well.

In accordance with one exemplary embodiment, the profile 400 can be used to assist with maintaining product and service information for which the user has or has an interest in and can be utilized in conjunction with the STB to provide a service to one or more users who may carry the product and/or service, as well as to one or more trusted or other entities. The STB can also store customer service records specific to an individual, one or more devices, a business, a trusted entity, or an entity from which the customer has received service application support in the past. The same method used to assist with a customer service contact as discussed above could similarly be used to access records or other information stored in the profile 400 to assist with business services, business management, online banking, product locating services, service locating services, targeted advertising based on the information in the profile, technical support, DIY support, medical assistance, learning services, or the like.

For example, the same mechanisms can be used to push structured information, such as service applications, and menu information for the requested service that may facilitate assistance with a particular problem. This richer experience combined with the ease of retrieval of customer related information, personal information, device information, medical information, or the like from the profile 400 provides a significantly richer customer contact capability then that which is offered by traditional internet services.

In accordance with an exemplary embodiment, the profile 400 used in conjunction with one or more applications on the STB 500 provides a richer experience for the user of the STB for interacting with one or more product/service providers or in general any entity that is able to provide a richer customer experience based on information available to them or requested from them in conjunction with the profile 400.

Figure 2:
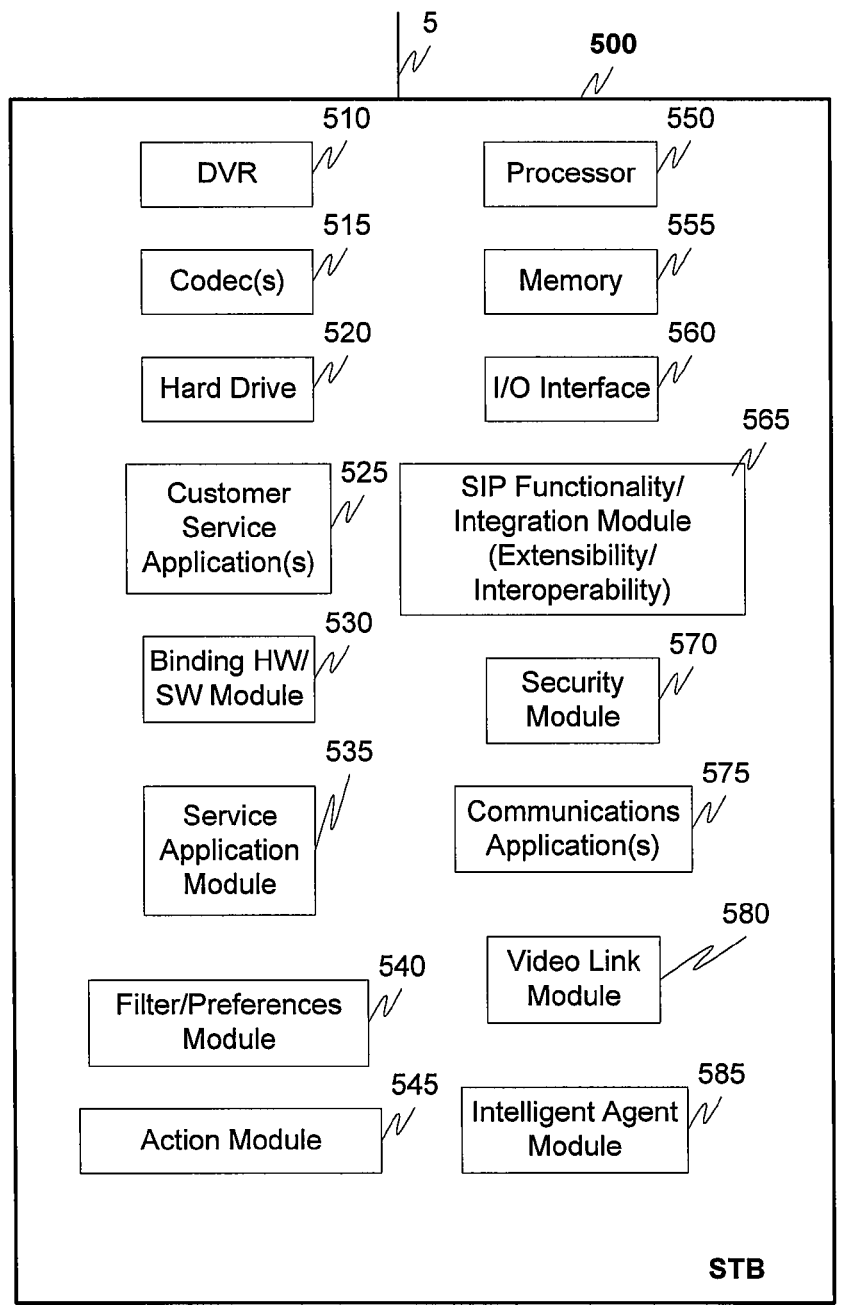
FIG. 2 illustrates an exemplary set-top box according to this invention.

FIG. 2 illustrates in greater detail an exemplary STB 500. The exemplary STB 500 includes one or more of a DVR 510, a codec 515, hard drive 520, one or more customer service applications 525, a binding hardware/software module 530, a service application module 535, a filter/preferences module 540, an action module 545, a processor 550, a memory 555, an I/O interface 560, a SIP functionality/integration module 565, a security module 570, one or more communications applications 575, a video link module 580 and an intelligent agent/expert system module 585. The intelligent agent module 585 can at least provide dynamic functionality in accordance with one or more applications associated with the STB 500.

The STB includes one or more codec's 515 that provide one or more of coding and decoding of video information, audio information, high-definition video information, multi-media information, or in general any information be it audio or video or combination thereof received by or sent from the STB 500.

The DVR 510 can be used to store information, such as video information as is conventionally known, and also can be used as a storage device for one or more applications on the STB 500. For example, the DVR 510 can be used as a back-up for non-active applications, while active applications can be run on, for example, the hard drive 520 in conjunction with one or more of the processor 550, memory 555 and I/O interface 560.

The STB 500 also includes one or more customer service applications 525. These customer service applications can cooperate with the profile 400 to provide various functionalities to a user at one or more of the TV 900, PC 800, stereo 700, or in general, any electronic device 600 associated with the STB 500. As discussed above, these customer service applications can include, but are not limited to, technical support, problem assistance, detected service problem remedies, improved problem diagnosis, product locating services, targeted advertising services, service locating services, online ordering services, dynamic advertising services with enhanced communication to an agent, or in general any application that is capable of operating on or in conjunction with the STB 500. As will be appreciated, the application(s) need not run exclusively on the STB 500, but could operate in conjunction with one or more other applications on, for example, a connected electronic device such as PC 800.

The hardware/software binding module 530 allows the STB 500 to be associated with one more other electronic devices, such as a telephone, soft phone, camera, video camera, microphone, diagnostic test equipment or probe, or in general any device capable of being bound to the STB 500. For example, if a user activates a service application on the STB 500 to be notified about a failure of a piece of home-based medical equipment, the hardware/software binding module 530 can be used to link to the medical equipment and allow diagnostic routines running on the STB 500 to monitor the operation of the device. Since the device would be bound to and monitored by the STB, the STB could initiate an assistance call in the event the device malfunctions.

The assistance call could optionally utilize the SIP functionality/integration module 565, in that SIP provides a convenient mechanism to establish, tear down, or redirect communications. More specifically, stored within the profile can be information specifying phone information associated with the user of the STB 500, and who to contact in the event the particular medical device fails. SIP protocols can be initiated from the STB to specify that the phone associated with user is to place a call to a specific customer service agent. A message indicating that a phone call has been initiated can then be displayed on one or more of the phone and the device associated with the STB 500, and necessary information such as the make, model number, failure information, and the like can be supplied to the customer service agent.

The service application module 535 provides one or more interfaces, such as a a graphical user interface, which can be displayed on one or more of the TV 900, PC 800, communication device 950, or in general any display capable device that allows the display of information associated with a service application. In addition, the service application module 535 includes a menu component that allows a user to access and navigate information in the profile 400 and/or information provided by a support entity. The service application 535 can also be used in conjunction with various customer service applications 525 residing on the STB to provide necessary menus to the user associated with a particular service that was requested. For example, the user may request to be notified when a technical service bulletin about a recently purchased vehicle is available. This query can be sent to one or more vendors, such as the car dealer, on a predetermined or on a periodic basis. When information about the vehicle is available, the vendor can push information about the vehicle, such as directions for service with an interactive pictorial-based menu, or an instruction to schedule an appointment at the dealer, to the user at the STB. The service application module 535 can filter this information, in conjunction with the filter/preferences module, as discussed hereinafter, and provide various menus to the user that allow the user to take an action. For example, and in cooperation with the action module 540, a communication with the dealership can be initiated to schedule a repair appointment. The menu component of the service application module 535 can also cooperate with one or more of the content/service provider/vendor 300 and trusted entities 200 to provide menus to a user of the STB 500 in conjunction with one or more of the services, products, or features provided by that particular entity.

The filter/preferences module 540 cooperates with one or more of the other modules to filter and/or apply user preferences to services running on or content sent/received by the STB 500. For example, various rules can be established by the user that regulate one or more of receipt of content, contact modalities, whether or not a communication from one or more technical support vendors will be accepted, price filtering criteria, which can include filtering based on past charges, a forwarded schedule of charges, whether or not the user currently has a support agreement with a particular vendor, or in general any criteria directed to one or more aspects of the service applications, or the like. Filtering can be applied prior to display of any information to a user associated with the STB, and can also be applied to any requests from an associated service application provider for information contained in the STB, thereby protecting a users privacy.

The filter/preferences module 540 can also be used to regulate how information associated with the one or more service applications are provided and/or displayed to the user, and whether or not the information should be forwarded to any associated electronic or communication device in conjunction with the action module 545. For example, a user could specify for a certain type of problem, information from a service application should be displayed on the associated PC. In another example, and perhaps in conjunction with the action module 545 and intelligent agent module 585, a preference could be established by the user such that in the event a particular service interruption is encountered, the STB contacts the user at one or more communication devices associated with the STB, forward information about the encountered problem and automatically initiated a SIP communication from the contacted communication device to a service provider. This can be accomplished since the STB has knowledge of the service that was interrupted, information in the profile about the user and who to contact in the event of an interruption.

In general it should be appreciated that any filtering criteria can be associated with any content sent from, received by or displayed/played by the STB.

The action module 545, optionally in conjunction with one or more preferences of the user, and the intelligent agent module/expert system 585 can be used to manage actions to take based on one or more service applications. For example, the action module 545 can be used to display content associated with the one or more service application, to send a notification based on the receipt of service application information, whether service application information should be forwarded to an alternate destination, whether service application information should be provided at a predetermined time or upon the next startup of the STB, whether or not dynamic activity, such as the initiation of a call to a technical support representative should be commenced upon the occurrence of a particular event(s), or the like.

Interaction with the STB is also allowed such that if a user utilizing a service application is in need of additional information, the action module 545 can recognize the request via, for example, a user interface for the information and initiate a communication to a service application provider to request the information. As discussed, since the STB can have knowledge about how to contact the service application provider and the STB has knowledge of the user's communication devices, and associated devices, the STB could initiate a call to the application service provider or initiate a two-way video conference with the service provider, or provide chat capabilities with the service provider, or, in general, any requested activity by the user which can initiate a corresponding action in conjunction with the action module 545.

The action module 545 can also analyze incoming information to determine whether or not there is supplemental content associated with the incoming information, such as a schematic, Powerpoint® demonstration, instructions on how to install diagnostic equipment, or the like, and if so, how to process that content.

The SIP functionality/integration module 565 allows one or more SIP-based communications to be used in conjunction with the STB 500 and profile 400. The SIP-based communications could be run in parallel with various applications run on the STB and, as discussed above, can be bound to one or more other devices such as a telephone, PDA, home phone, business phone, or in general, any SIP enabled device. In addition to being able to run in parallel with one or more applications on the STB 500, upon execution of a specific customer service application initiated in the STB, a SIP communication session could be established and once active the corresponding communication on the STB could optionally be terminated.

Security module 575 can provide varying levels of security for the information in the profile 400. Furthermore, as previously discussed, a hierarchical security platform can be established with, for example, a master profile that regulates dependent profiles, such as those that would be established by parents for their children. Extending this basic concept to a business environment, business managers could also establish various rules in conjunction with the security module 570 regulating the control, access to and usability by employees of information stored in the profile 400.

In general, since any information can be stored in the profile 400, various rules, policies, profiles and the like, can be established to govern not only access to but dissemination of the information within the profile. For example, access to the various types of information in the profile can be regulated based on who is trying to access the information, what type of information is being accessed, and what the accessed information is going to be used for. These factors can be considered and analyzed by the security module 570 (optionally in cooperation with the intelligent agent module) to determine whether access to or dissemination of specific information should be allowed. For example, the security module 570 can cooperate with the intelligent agent module 585 to assist with analysis of any security risks that may be associated with providing access to or disseminating of information within the profile 400.

As an example, assume a service application running on the STB detects an incident requiring technical support, and a query is initiated to the content/service provider to assist with finding a vendor to supply the necessary technical support. Upon receiving a list of technical support vendors from the content/service provider, the intelligent module 585 can query one or more databases to determine whether or not the vendor is reputable, such as the Better Business Bureau®, and in addition to the filtering criteria in place by the user, determine whether or not it is safe to allow technical support to be provided by that particular vendor based on, for example, what payment terms they have, what is their customer service rating, or in general any information about the vendor.

If, for example, it is determined that the provider has a good customer service ranking, a menu allowing ordering of the particular requested service can be sent to the user. However, if the intelligent module 585 determines that the provider has a bad customer service ranking, the intelligent agent module 585 can one or more of block a solicitation of services from that service provider, can notify the user that filtering criteria have been met to eliminate one or more providers based on a bad customer service ranking, and provide the user the ability to override the intelligent agent modules determination of blocking provider, thereby allowing the ordering process to be completed.

Communications application modules 575 enable various types of communications applications to be used with the STB 500. These communications include, for example, audio communication, video communications, chat communications, telephony-type communications, multi-media communications, advertising communications, real-time video communications, real-time two-way communications or in general, any communication between the STB and another entity or entities on the network. These various communications can be forwarded to one or more of the devices associated with the STB or to another entity on the network in conjunction with the hardware/software binding module 530.

The video link module 580 allows a video link to be established between the user's STB and, for example, an entity on the network such as a salesperson at a store. This video link can provide one or two way video communication between the parties with the option of the video link being in high definition and including multi-media functionality such as menus, presentations, dynamic presentations, and the like. The video link module 580 can cooperate with the hardware/software binding module 530 and the SIP functionalities/integration module 565 to allow a video link to be forwarded to any location within the network and/or to any video enabled device associated with the user. The video link module 580 can also cooperate with the SIP functionality/integration module 565 and the hardware/software binding module 530 to also establish a voice channel in parallel with the video link. It should be appreciated however that there may also be a voice channel utilized in conjunction with the video link such as that provided by a web cam and associated microphone installed on a personal computer or HDTV or digital TV associated with the STB, or even part of the STB itself.

The intelligent agent module 585 is a software agent that assists users with various functions and is capable of acting on their behalf in an automated or semi-automated manner. The intelligent agent module 585 is thus capable of cooperating with one or more of the other modules in the STB, or devices connected to the STB, and based on information and/or rules within the profile 400, performing various actions. The actions can be triggered by one or more triggering events, rules, or preferences that may be based on information received by the STB, or information sent to an entity on the network 10.

For example, upon receiving service failure, the intelligent agent could parse information about the failure, and knowing, based on information within the profile 400, and in conjunction with the action module 545, initiate an action.

As another example, the intelligent agent module 585 can monitor the various interactions between the STB and one or more entities on the network 10. If, for example, rules have been established that prohibit certain activities to be initiated from the STB, and the intelligent agent module detects that a user associated with the STB is trying to perform one of the prohibited activities, the intelligent agent module 585 can one or more, of block the attempted activity or spawn a communication to a particular destination, and/or log the attempt to perform the prohibited activity. For example, the intelligent agent module 585 can cooperate with an email or call initiation module and, for example, send a text message to an entity identified as a supervisor indicating that a user was trying to perform a prohibited activity a given date and time. This can be enabled with the cooperation of the SIP functionality module 565 and a text message sent to a SIP enabled endpoint. At the same time, a communication could be established between the SIP endpoint and the STB, and if this endpoint is video enabled, a real-time communication could be established between the supervisor and the user to discuss their activities.

Figure 3:
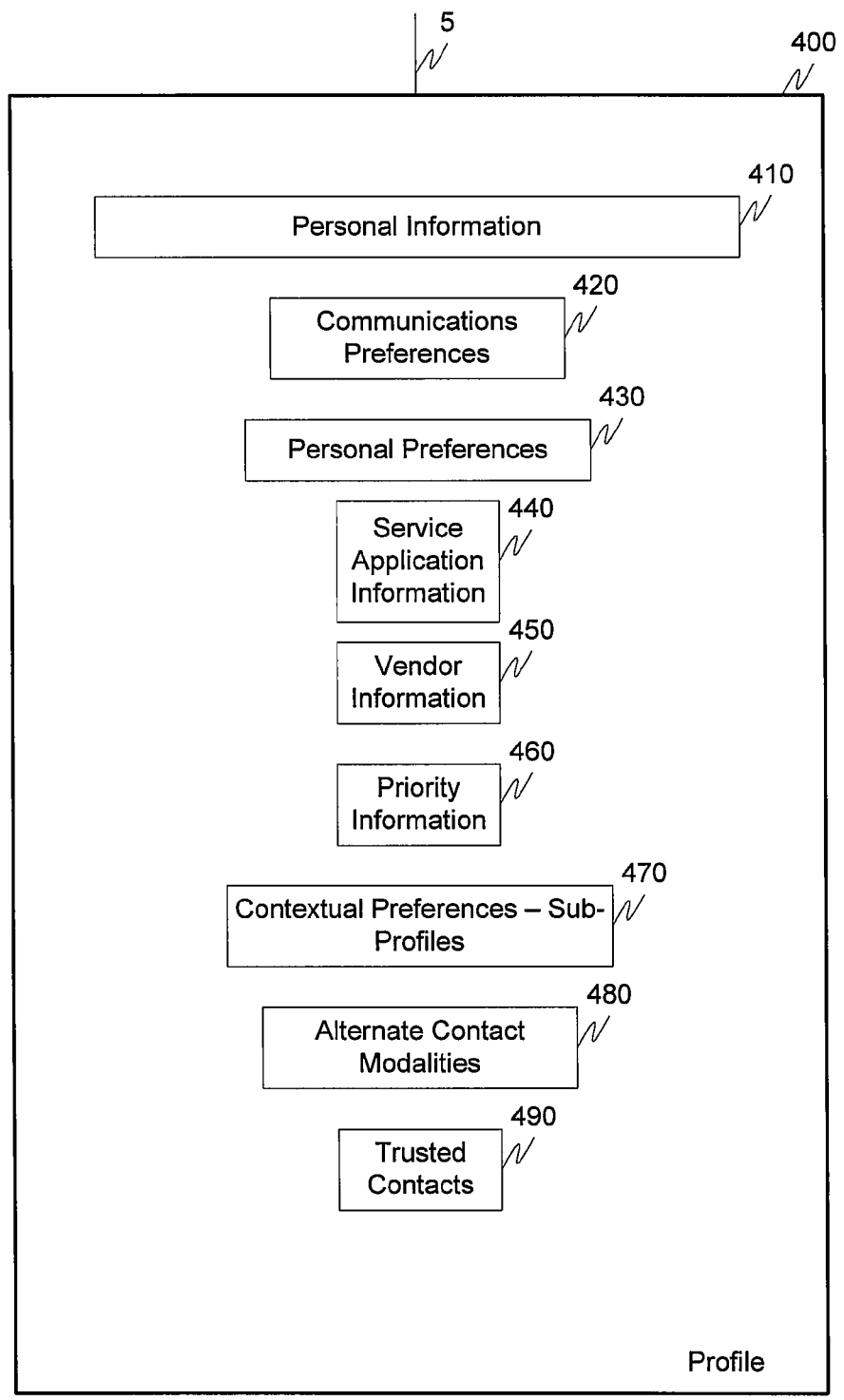
FIG. 3 illustrates an exemplary profile according to this invention.

FIG. 3 outlines an exemplary profile 400. The exemplary profile 400 comprises one or more of business, personal, and entity information 410, communications preferences 420, personal preferences 430, service application information 440, vendor information 450, priority information 460, contextual preferences and sub-profiles 470, alternate contact modalities 480 and trusted contact information 490.

One or more of the business, personal and entity information in the profile 400 can include any information that a user would like to store. For example, examples of personal information include name, address, credit card information, banking information, product preferences, communication preferences, vendor preferences, billing preferences, shipping preferences and the like. Examples of business information include, for example, preferred vendors, banking information, communication preferences, ordering or inventory information, employee information, payment information, accounting information, business management information, or in general any information related to a business. Entities can also include information about items such as groups of individuals, groups of businesses, or in general any entity that may not be personal or business in nature. Interfaces can be provided that provide access to the information stored within the profile, and this information can be edited, updated, or deleted as appropriate. The editing, updating or deleting of this information can be performed via an interface on the STB, or via an interface connected to the STB. This access to the information within the profile can be password protected, and the information can be transferred via or in accordance with well known encryption techniques and standards. Furthermore, information in the profile itself can be encrypted in accordance with well known encryption techniques and standards.

Communications preferences 420 provide to the user the ability to store various types of communications preferences or modalities that can affect not only the type of communication to use to access the user, e.g., video, chat, IM, telephone, multi-media, or the like, but that can also be used in conjunction with presence information and/or communication routing.

The personal preferences 430 are a set of rules related to a particular user's personal preferences. These personal preferences can relate to any functionality of the STB, display characteristics of the STB, operation of the STB, or the like, and can be related to any one or more of menu options, communications preferences, contact preferences, STB management, or the like.

Service application information 440 can include information such as provided service information, device information, device model and serial numbers, support providers for the one or more devices, support providers for the one or more services, service history, preferred service providers, priority handling information associated with the one or more devices or services, or in general any information about or associated with a service application and/or an associated device or service.

Vendor information 450 stores various information that can be used for payment of goods and/or services ordered through or in conjunction with the STB. This payment information can have higher security level than other types of information within the profile 400, such that a password is required but where the purchase of goods and/or services can be made. The payment information could also be limited to use by the contact/service provider 300.

Vendor information 450 can include such information as preferred vendors, vendors who should not be used, historical purchase information, account information, preference information associated with a particular vendor, ad statistics regarding a particular vendor, or in general any information associated with a vendor and/or advertisements associated with that vendor. When new vendors are utilized, and in conjunction with the intelligent agent module 585, new information can be added to the vendor information 450 and stored in the profile 400. Furthermore, the intelligent agent module 585 can automatically supplement information regarding the vendor in the vendor information 450 such as the current status of that vendor with the Better Business Bureau®, other users rankings associated with that vendor, or the like.

In addition, also in conjunction with the intelligent agent module 585, the vendor information 450 can be dynamic such that as a user accesses a particular vendor's website, account information can be populated into the vendor information 450 such as support orders placed, remaining balance, special offerings, or in general any information associated with that particular vendor.

Priority information 460 includes any information, such as rules, that can be used to assist with prioritizing the service applications, or certain activities, such as those performed in conjunction with the action module 445. In general, priority information 460 can be utilized to assist with prioritization of any functionality associated with the STB 500. This priority information 460 could also be used in conjunction with the intelligent agent module 585 to assist with determining prioritization of one or more actions performed by the intelligent agent module 585.

The contextual preferences and sub-profiles 470 establish preferences based on context that could also be categorized as sub-profiles dependent on, for example, a particular application being run on the STB 500. As with other types of information, the contextual preferences 470 can be used in conjunction with the intelligent agent module 585 to provide dynamic application behavior.

The alternate contact modalities 480 contain various contact modalities for a particular user. These alternate contact modalities 480 can be used with the communication preference information, personal preference information, and/or priority information to assist with completion of an incoming communication to an endpoint. For example, based on information in the alternate contact modalities profile 480, one or more of the binding module and SIP functionality module can be utilized to complete incoming communication to an endpoint where the user is located. For example, if the various rules and thresholds have been met, and present, information associated with a service application can be forwarded to an associated PDA for viewing by the user a predetermined time after receipt at the STB.

Trusted contacts 490 include information regarding one or more entities that are trusted. For example, an entity can be identified as being trusted if it is approved by the content/service provider 300, user, or based on a dynamic determination such as one or more of information provided by a business ranking organization, such as the Better Business Bureau®, user rankings, and the like. Additionally, an entity could be trusted and automatically labeled as such if the user has had previous interactions with the entity and has identified those transactions as being positive.

Optionally, the intelligent agent module 585 can also be used to analyze transactions with a particular entity, and, for example, upon a threshold number of transactions being completed in a satisfactory manner, the entity can be identified as trusted. This can occur automatically or in conjunction with a query to the user associated with the STB confirming that they would like to identify the entity as trusted.

The trusted entities need not be limited to businesses that sell goods and/or services, but can also include entities such as schools, other individuals, or in general, anyone or any entity that is identified as being trusted. For example, in a social network environment, parents can establish rules that can identify certain chat groups or other users that are trusted. In conjunction with the intelligent agent module 585, for example, a child can request a parent to approve a specific entity, such as a tutor, as trusted, and communications with that entity are restricted until approved by a parent.

Trusted status can also be achieved by, for example, the intelligent agent module 585 analyzing an entities, users, or feedback. Upon a merchant having reached a threshold level of feedback, the agent can identify the merchant as "trusted" which could then optionally forward the trusted identification to an additional entity, such as a parent, for final approval.

Figure 4:
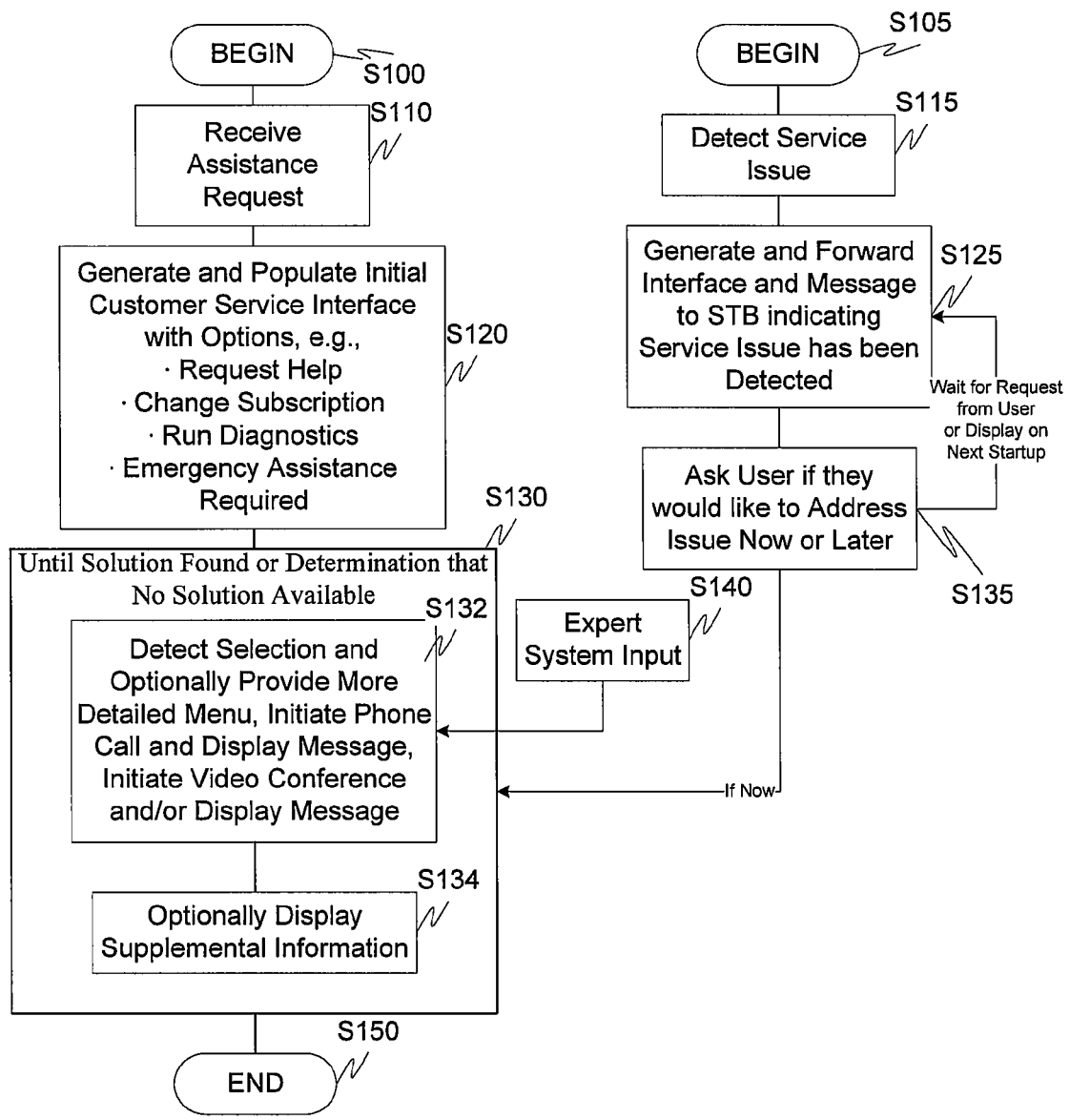
FIG. 4 outlines an exemplary method for initiating a service application according to this invention.
Figure 5:
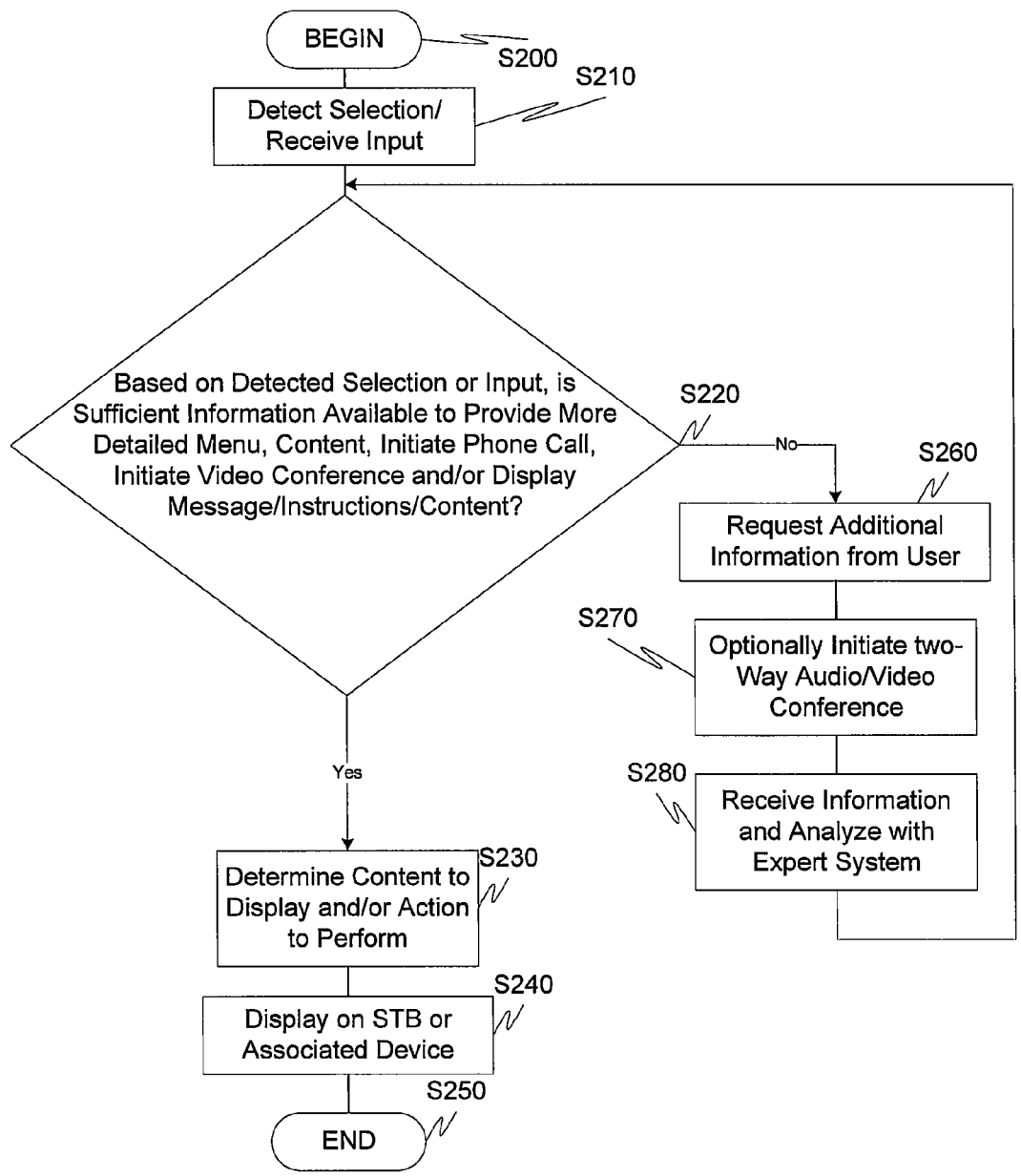
FIG. 5 illustrates an exemplary method for drilling-down into a service request according to this invention.

FIGS. 4-5 illustrate exemplary methodologies for service applications according to specific aspects of this invention. In particular, FIG. 4 outlines an exemplary method for initiating a service application according to this invention. Initiation of the service application can begin at either step S100 or step S105 depending on, for example, whether an assistance request has been received or a service issue has been detected, respectively.

More specifically, in step S110, a request for assistance is received. Next, in step S120, an initial customer service interface can be generated and populated with various options available to a user such as request help, change subscription, run diagnostics, request emergency assistance, or in general any option can be provided. Furthermore, these options can be dynamically populated based on information received by the STB. For example, if a service application is running on the STB and associated monitoring device(s), and an error alert is received from one or more of the associated devices, the initial customer service interface can be dynamically populated with specific options based on the type of device from which the error message was received. Next, in step S130, two substeps are performed until a solution is found or a determination is made that no solution is available.

More specifically, in step S132, and optionally with input from an expert system S140, menu selections are detected and one or more of more information provided, additionally detailed menus provided, phone communications initiated, messages displayed, video conferences initiated and/or one or more types of information displayed or played on the STB. Next, in step S134, supplemental information can be provided to a user. Control then continues to step S150 where the control sequence ends.

Alternatively, as discussed above, the initiation of a service application can be based on the detection of a service issue in step S115. Next, in step S125, and upon detection of the service issue, one or more of an interface and message can be generated and forwarded to the STB indicating a service issue has been detected. This functionality can be optionally automated or semi-automated with, for example, user approval before the message is sent out. Then, in step S135, an interface can be provided that queries the user if they would like to address the issue now or at a later time. If the user would like to wait and address the issue at a later time, control jumps back to step S125 where the system waits for a request from the user to address the issue and/or the message is displayed on the next startup of the STB.

Alternatively, if the user would like to address the issue now, control jumps to step S130.

As an example, assume a student needs assistance with a particular math problem. This student can enter a request that is received by the STB with a query for tutor assistance with the math problem. This specific request for assistance can be forwarded to, for example, a service provider that farms out the request to a number of available providers that assist with learning. Each of these providers can send a communication to the user associated with the STB with information such as availability, pricing, and/or requests for more specific information about the type of tutoring required.

The student can then select a tutor from which they desire assistance and order services from that tutor. That tutor can then, for example, initiate a two-way video conference with the student to discuss the particular math problem in question utilizing, for example, white-boarding capability that is displayed on a PC or TV associated with the STB. Once the designated amount of tutor time has elapsed, and/or the student has solved the math problem, the service can be terminated and a bill optionally forwarded to the STB for payment by the user.

In another exemplary embodiment, assume the STB monitors a plurality of pieces of equipment at a grocery store. In conjunction with the hardware binding module discussed above, the STB is associated with the food refrigerator section of the grocery store. A service application running on the STB monitors the temperatures in the refrigerated food section looking for an indication that a failure is imminent or a failure has occurred. Upon an indication that a failure is imminent, or that a failure has occurred, a message can be automatically forwarded to the service repair company that the grocery store has a contact with. A message can include such information as the make and model number of the refrigeration unit that failed, whether or not this is a user serviceable failure, and in general can include any information about the particular failure that may assist with the service of the device. Based on the nature of the failure, the contractor can one or more of forward information, including drawings, illustrations, schematics, video instruction, or the like, to the STB for someone at the grocery store to take corrective action in an attempt to repair the refrigeration device. Alternatively, if the failure is not user serviceable, the contractor can initiate a truck roll to repair the refrigeration unit.

The expert system can assist a service provider and the service application with diagnosing and/or repairing a problem. For example, the expert system can be associated with a diagnostic tool that can be bound to the STB. There may be special logic associated with the diagnostic tool based on the expert system programmed into the diagnostic tool that can guide a user via one or more menus displayed in conjunction with the STB to guide the user on usage of the diagnostic tool.

In another exemplary embodiment, the STB can be bound to a security appliance. If, for example, the security appliance detects glass breakage, the STB, in cooperation with the intelligent agent module and action module, can initiate a 911 call as well as a video feed from the STB that is capturing premise video information and forward that to 911 representatives to assist with dispatching the correct emergency equipment.

FIG. 5 outlines in greater detail a dynamic process of providing the service application according to an exemplary embodiment of this invention. In particular, control begins in step S200 and continues to step S210. In step S210, the input is received. For example, this input can be received in response to electable menu items on the STB. Next, in step S220, and based on the input, a determination is made whether sufficient information is available to provide a more detailed menu, whether content should be provided, whether or not to initiate a phone call or other communication such as a video conference, whether or not a message should be displayed and/or instructions or other content provided with the STB. In addition to instructions, an executable application could also be forwarded to the STB for running thereon, or on a device associated with the STB. if sufficient information is determined to be available in step S220, control continues to step S230 where a determination is made as to which content to display and/or action to perform. If sufficient information is not available, control jumps to step S260 where the user is requested to provide additional information and/or provide instructions with how to obtain additional information for the service application. Next, at step S270, a two-wave video/audio/multi-media conference can optionally be initiated, then at step S280, received information can be input into and analyzed by an expert system if it is deemed that expert system analysis is appropriate for this particular service application. Control then jumps back to step S220 where a determination is made whether there is sufficient information to assist with diagnosing the problem and providing, for example, problem resolution instructions.

As illustrated in FIG. 5, the process of requesting information and providing content and/or performing an action can be dynamic and iterative in nature with, for example, updated menus, information, instructions, or actions, such as the initiation of an audio/video conference, or the like, capable of being provided.

In accordance with another exemplary embodiment, and again in conjunction with a bound hardware device, the STB can be used as a conduit to assist with the control of the bound hardware device. For example, assuming an associated device has a technical problem; technical support agent could remote-in to the device having the problem and, for example, push instructions to that device to assist with the diagnosis and/or repair of the problem. This functionality could be realized using SIP communication protocols, Bluetooth®, or in general any communication protocol that allows the STB to communicate with the associated device.

A number of variations and modifications of the invention can be used. It would be possible to provide for some features of the invention without providing others.

The exemplary systems and methods of this invention have been described in relation to STB's and profile(s). However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated, certain components of the system can be located remotely, at distant portions of a distributed network 10, such as a LAN, cable network, and/or the Internet, or within a dedicated system. Thus, it should be appreciated, that the components of the system can be combined in to one or more devices, such as a STB, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, in one or more communications devices, at one or more users' premises, or some combination thereof. Similarly, one or more functional portions of the system could be distributed between a communications device(s), such as a STB, and an associated computing device. The one or more functional portions of the system could be also be installed in a TV or TV tuner card, such as those installed in a computer.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, sub-combinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A set-top box with an operating system layer operable to support cable network interconnectability and to provide an application platform comprising:
   one or more profiles, stored on the set-top box, each profile including personal information and personal preferences, one or more of the personal information and personal preferences used in association with a service application;
   a service application module, the service application module one or more of receiving an assistance request or detecting a service issue and populating an interface on the set-top box with one or more options, the one or more options including a help request, a subscription change, diagnostics or emergency assistance, the interface also capable of indicating a service issue has been detected; and
   a Session Initiation Protocol (SIP) functionality module that allows one or more SIP-based communications to be used in conjunction with the set-top box and the one or more profiles, the one or more SIP based communications running in parallel with one or more applications running on the set-top box and the one or more SIP-based communications bound to one or more additional devices, the one or more additional devices capable of forwarding diagnostic information to the service application module on the set-top box that is usable by an expert system and a diagnostic tool with one or more of diagnosing, addressing, fulfilling and repairing the service issue, the service application module is also in communication with a service provider that can farm out to one or more other providers information relating to the service issue, with one or more of the one or more other providers able to send a communication to a user associated with the set-top box, the communication including information including one or more of: availability, pricing, and a requests for more specific information about the type of service issue.

2. The set-top box of claim 1, wherein the one or more profiles comprise one or more of personal information, communications preferences, personal preferences, advertising information, vendor information, priority information, contextual preferences, one or more sub-profiles, alternate contact modalities and one or more trusted contacts.

3. The set-top box of claim 1, adapted to receive one or more of television programming, data, voice information, internet communications, VOIP communications, ecommerce communications, communication from attached electronic devices, advertising information, sales information, ads, dynamic ads, information associated with the one or more ads and content.

4. The set-top box of claim 1, wherein the expert system cooperates with the service application module.

5. The set-top box of claim 1, further comprising a menu module, the menu module operable to provide one or more of a detailed menu, an initiate phone call and message display, initiate a video conference and display a message.

6. The set-top box of claim 1, wherein the service application module includes an initiate service transaction request that includes information from one or more profiles, the initiate service transaction request utilizing internet-based protocols to communicate with one or more of a trusted entity, a content/service provider, an intelligent agent and an IVR system to coordinate receipt of information related to one or more products and services.

7. The set-top box of claim 1, further comprising a binding module operable to bind the one or more additional devices to the set-top box.

8. The set-top box of claim 7, wherein the one or more additional devices include a phone, a SIP enabled device, an electronic communication device, a soft phone, a multimedia device, an audio device, a PDA, a video device and a electronic device.

9. The set-top box of claim 1, further comprising a security module operable to one or more of filter, analyze, restrict access to, restrict dissemination of and control information in the one or more profiles.

10. The set-top box of claim 1, further comprising one or more sub-profiles, the behavior of which is governed by the one or more profiles.

11. A method of operating a set-top box having an operating system layer operable to support cable network interconnectability and to provide an application platform comprising:
   establishing one or more profiles, the profiles stored on the set-top box, each profile including personal information and personal preferences, one or more of the personal information and personal preferences used in association with a management service application;
   managing a service application module, the service application module one or more of receiving an assistance request or detecting a service issue and populating an interface on the set-top box with one or more options, the one or more options including a help request, a subscription change, diagnostics or emergency assistance, the interface also capable of indicating a service issue has been detected; and
   allowing one or more SIP-based communications to be used in conjunction with the set-top box and the one or more profiles, the one or more SIP-based communications running in parallel with one or more applications running on the set-top box and the one or more SIP based communications bound to one or more additional devices, the one or more additional devices capable of forwarding diagnostic information to the service application module on the set-top box that is usable by an expert system and a diagnostic tool with one or more of diagnosing, addressing, fulfilling and repairing the service issue, the service application module is also in communication with a service provider that can farm out to one or more other providers information relating to the service issue, with one or more of the one or more other providers able to send a communication to a user associated with the set-top box, the communication including information including one or more of: availability, pricing, and a requests for more specific information about the type of service issue.

12. The method of claim 11, wherein the one or more profiles comprise one or more of personal information, communications preferences, personal preferences, advertising information, vendor information, priority information, contextual preferences, one or more sub-profiles, alternate contact modalities and one or more trusted contacts.

13. The method of claim 11, further comprising receiving one or more of television programming, data, voice information, internet communications, VOIP communications, ecommerce communications, communication from attached electronic devices, advertising information, sales information, ads, dynamic ads, information associated with the one or more ads and content.

14. The method of claim 11, wherein the expert system cooperates with the service application module.

15. The method of claim 11, further comprising causing to be displayed one or more menus that provide one or more of a detailed menu, an initiate phone call and message display, an initiate a video conference display and a display a message display.

16. The method of claim 11, wherein the service application module includes an initiate service transaction request that includes information from one or more profiles, the initiate service transaction request utilizing internet-based protocols to communicate with one or more of a trusted entity, a content/service provider, an intelligent agent and an IVR system to coordinate receipt of information related to one or more products and services.

17. The method of claim 11, further comprising the binding one or more additional devices to the set-top box, wherein the one or more additional devices include a phone, a SIP enabled device, an electronic communication device, a soft phone, a multimedia device, a PDA, an audio device, a video device and a electronic device.

18. The method of claim 11, one or more of filtering, analyzing, restricting access to, restricting dissemination of and controlling information in the one or more profiles.

19. The method of claim 11, further comprising establishing one or more sub-profiles, the behavior of which is governed by the one or more profiles.

20. A means for operating a set-top box having an operating system layer operable to support cable network interconnectability and to provide an application platform comprising:
means for establishing one or more profiles, the profiles stored on the set-top box, each profile including personal information and personal preferences, one or more of the personal information and personal preferences used in association with an ad management application;
means for managing a service application module, the service application module one or more of receiving an assistance request or detecting a service issue and populating an interface on the set-top box with one or more options, the one or more options including a help request, a subscription change, diagnostics or emergency assistance, the interface also capable of indicating a service issue has been detected; and
means for allowing one or more SIP-based communications to be used in conjunction with the set-top box and the one or more profiles, the one or more SIP-based communications running in parallel with one or more applications running on the set-top box and the one or more SIP based communications bound to one or more additional devices, the one or more additional devices capable of forwarding diagnostic information to the service application module on the set-top box that is usable by an expert system and a diagnostic tool with one or more of diagnosing, addressing, fulfilling and repairing the service issue, the service application module is also in communication with a service provider that can farm out to one or more other providers information relating to the service issue, with one or more of the one or more other providers able to send a communication to a user associated with the set-top box, the communication including information including one or more of: availability, pricing, and a requests for more specific information about the type of service issue.

* * * * *